Figure 1:
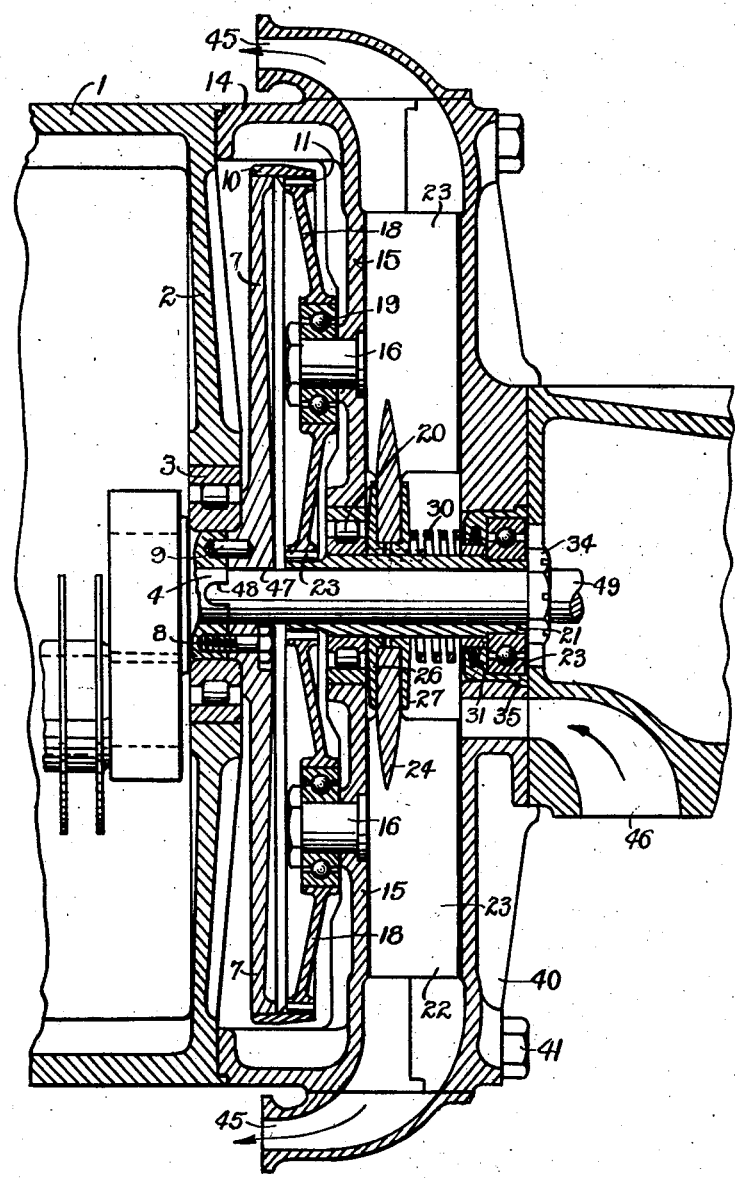

Patented Mar. 21, 1933

1,902,095

UNITED STATES PATENT OFFICE

BEN G. PARSONS, OF HOUSTON, TEXAS

BLOWER AND DRIVING GEAR FOR ENGINES

Application filed January 6, 1930. Serial No. 418,724.

The invention relates to a blower for feeding fuel to internal combustion engines and the driving mechanism for such blower.

It is one of the objects of the invention to devise a structure capable of driving the blower fan at a greater speed than the crank shaft of the engine.

Another object of the invention is to devise a compact gear train for multiplying the speed of the crank shaft and imparting this increased speed to the fan rotor, said train being adapted for housing in a small longitudinal space.

Still another object of the invention is to arrange a set of internal gears which will accomplish the purpose in view and occupy but a very small space.

It is also one of the objects of the invention to frictionally mount the impeller with respect to its drive shaft so that in event of excessive friction it may slip with respect to the shaft.

A still further object of the invention is to arrange the gears, the impeller and the bearings for these parts in such manner that they may be quickly assembled and held in position by a single fastening member.

Other and further objects of the invention will be readily apparent to those skilled in the art to which the invention appertains when the following description is considered in connection with the accompanying drawing wherein a central vertical section taken through the rearward end of an internal combustion engine is shown.

The present invention is particularly adapted for attachment to radial engines of the two-cycle type having no valves. In engines of this type there is no separate suction stroke to draw in the new charge of fuel such as is present in engines of the four-cycle type. It is, therefore, necessary to maintain a constant pressure on the inlet openings of the various cylinders so that a full charge of fuel will be forced into each of them. Obviously, however, the blower is capable of use with engines other than that just described and it is not the present intention to limit the use to any particular type of engine.

By having reference to Fig. 1, the crank case will be seen as indicated at 1. This crank case is of the disc or drum type having a rear wall 2, which is adapted to receive and support the main rear bearing 3 of the crank shaft. It is understood that the radial cylinders project outwardly from the case 1 as is customary, but such cylinders have not been shown for the purpose of simplicity. The crank shaft is shown at 4 and has its extreme end mounted within the bearing 3.

The present invention is adapted for attachment to the end of the crank shaft and comprises a relatively large internal gear, which is composed of a spider 7 and may be made of aluminum or any other desired material. This spider 7 is shown as connected to the end of the crank shaft by means of cap screws 8 and dowel pins 9 so that it will rotate at the same speed as the crank shaft. The periphery of the gear is composed of a ring 10 having teeth 11 on its inside face. This ring may be formed integral with the spider 7 or may be shrunk onto this spider as desired, but is made of a high grade steel to give satisfactory service. A housing 14 is shown as surrounding the gear 7 and fitting against the crank case 1 in such manner that any leakage of lubricant will be prevented. This housing has a partition 15, which, with the rear wall 2 of the crank case, forms a closed chamber in which the gear 7 is mounted. The wall 15 carries a plurality of stub shafts 16 upon which are mounted the pinion gears 18. These gears are mounted on suitable bearings such as 19 and are adapted to engage with the teeth 11 on the internal gear 7.

The partition 15 also carries a bearing 20, which serves to support the sleeve 21. This sleeve 21 serves as the hub of the blower fan 22 and has gear teeth 23 formed on its inner end, these teeth being adapted to mesh with the teeth 24 upon the pinions 18. In this manner it will be seen that a simple and compact gear mechanism has been provided which occupies but a very small space but yet permits a great increase in the speed ratio between the crank shaft 4 and the sleeve 21 of the blower fan. It is obvious that any desired speed ratio may be obtained by varying the size of the respective gears but it has been found that a speed ratio of about 9 to 1 is satisfactory for the engine involved in the present experiments.

The blower fan or impeller 22 is mounted upon the sleeve or hub 21 and comprises the blades 23 and the web portion 24, which connects the adjacent blades. In order to arrange for a friction drive between the impeller and the sleeve 21 there has been provided a flange 26 formed upon a ring which is slipped onto the sleeve 21. The impeller is next passed onto the sleeve and placed upon said ring against the flange 26. A similar ring with a flange 27 is then placed against the impeller on its outer side and a spring 30 is used to retain the two flanges and impeller in assembled position. A key is shown as locking the two rings 26 and 27 onto the sleeve 21 so that they will rotate therewith. The spring 30 is held in position by a ring 31, which is passed over the sleeve 21. The bearing 33 is placed upon the sleeve 21 and retained in place by a lock nut 34. A suitable ring 35 is shown as retaining the usual felt washer to prevent leakage of lubricant past the shaft. It will be seen from the foregoing that in order to assemble the device it is only necessary to place the gear 7, housing 14, the flange 26, the impeller 22, and the flange 27, spring 30, and the bearing 33, in position upon the sleeve 21, all of these elements being retained in place by the lock nut 34. With this construction, if the impeller becomes bent, or broken, or any obstruction enters the chamber, the resistance will prevent rotation and the impeller may slip between the flanges 26 and 27. Very serious injury and damage to the engine may be avoided by this construction and excessive stresses on the parts avoided.

The impeller 22 is enclosed by the rear end 40 of the housing 14. Both the wall 40 and the housing 14 are retained in engagement with the crank case by means of nuts 41, which are placed upon stud bolts projecting from the crank case. Suitable outlets 45 are shown as leading to the inlet ports of the respective cylinders so that a pressure from the blades 23 of the impeller will be maintained upon the cylinder inlets. The inlet to the impeller is shown at 46.

The sleeve 21 is shown as hollow and there is an opening 47 in the center of the spider 7 and also the lock nut 34. It will be noted also that the end of the crank shaft 4 has a cross slot 48 therein. This structure is provided in order that the magneto, pump for the engine, or other attachments may be driven from the crank shaft. Thus it is only necessary to insert a shaft such as 49 through the center of the nut 34 and until it engages in the cross slot 48 in order that this shaft may be driven and the power therefrom applied in any desired manner. If it is desired to remove this attachment it may be readily accomplished without molesting the blower fan and driving gear.

The entire construction just described requires but a very small space and the thickness of the structure shown in the drawing is almost actual thickness for an eight-cylinder engine. Obviously, however, it may be made in any desired size.

The structure here described is very advantageous due to the compactness and simplicity in construction and also due to the fact that there are but few rotating parts.

What I claim as new is:

1. A device for feeding fuel vapor to internal combustion engines including a blower fan and driving gear therefor, said driving gear comprising an internal gear driven by the crank shaft of the engine, pinion gears meshing with said internal gear, a hub for said fan meshing with said pinions, said pinions being adapted to rotate within the plane of said internal gear, a pair of flanges keyed to said hub and adapted to frictionally engage said blower fan.

2. In combination with an internal combustion engine, a fuel pressure fan driven from the crank shaft of said engine, a gear train disposed between said fan and said crankshaft and comprising a large internal gear, pinions arranged for rotation within the plane of said gear and being of less diameter than the radius of said gear, a hub for said fan having teeth thereon adapted to mesh with said pinions, said fan including an impeller mounted on said hub, and resilient means arranged to frictionally connect said hub and said impeller.

In testimony whereof I hereunto affix my signature this 29 day of July, A. D. 1929.

BEN G. PARSONS.